3,013,035
PROCESS FOR MANUFACTURE OF
N-ACYL TAURINES
Frederic R. Huber, Ramsey, and Leslie M. Schenck, Mountainside, N.J., assignors to General Aniline & Film Corporation, New York, N.Y., a corporation of Delaware
No Drawing. Filed Dec. 1, 1959, Ser. No. 856,335
6 Claims. (Cl. 260—401)

This invention relates to an improved process of preparing N-acyl taurines.

The reaction of higher fatty acid chlorides with N-substituted amino alkane sulfonic acids to yield anionic surface active materials, N-acyl taurines, useful as wetting, cleansing, softening and dispersing agents is well known. The production of this type materials is fully described by Guenther et al. in their U.S. Patent No. 1,932,180. In actual commercial production of these materials, the process described by Kastens and Ayo in Ind. and Eng. Chem., vol. 42, pages 1630–1631 (1950) is generally employed, and is an example of a typical Schotten-Baumann reaction. During the actual manufacture employing the Schotten-Baumann reaction, appreciable hydrolysis of the acyl chloride occurs, resulting in the formation of soap as a by-product. The presence of soaps admixed with acyl taurides interferes with their lathering properties, and it is desirable, therefore, to keep the hydrolysis at a minimum. In the conventional batch process, this end can be accomplished by maintaining low temperatures and using excess molar ratios of the respective taurine. However, since the slurries of acyl-taurides found in commercial manufacture are quite viscous at low temperatures, adequate agitation in the batch process becomes a significant problem, especially toward the end of the reaction and lack of physical contact between the acyl chloride and appropriate taurine again promotes hydrolysis rather than tauride formation.

It is the principal object of the present invention to provide an improved process of preparing N-acyl taurines by the reaction of an amino alkane sulfonic acid with a fatty acid chloride in the presence of a surface active agent whereby higher yields and quality of the N-acyl taurine is obtained.

Other objects and advantages will be more clearly evident from the following discussion.

We have discovered that when acyl chlorides are reacted with an alkali metal salt of 2-aminoalkane sulfonic acid in the presence of a surface active agent other than an N-acyl taurine, increased yields and products of improved quality are obtained. In other words, we have found that the reaction promoting N-acyl tauride formation is favored over that promoting hydrolysis of the acyl chloride by the simple addition of a surface active agent other than an N-acyl tauride. The addition of such a surface active agent to the reaction mixture produces marked improvement in yields and quality of the product which is wholly surprising and unexpected since the Igepons formed in the mixtures themselves, are well known in the industry for their excellent wetting and dispersing properties, and find extensive industrial usage where these properties are desired. To our amazement, we have discovered that the addition of small amounts of surface active agent or dispersant other than an N-acyl tauride of the Igepon T type greatly reduces the viscosity of an Igepon slurry during certain stages of its manufacture, thereby providing a more intimate molecular mixing of the reactants and promoting the desired N-acyl tauride formation.

During the course of experimentation with our invention, we found that there exists the possibility that some unexplained surface phenomena takes place during the operation of our invention, possibly of a catalytic nature, which retards the hydrolysis of the acyl chloride. However, the overall effect is the desired one of increasing the conversion of acyl chloride to acyl tauride, with the consequent reduction of fatty acids or fatty acid soaps formed by hydrolysis of the acyl chloride. This in turn allows more complete utilization of the taurine present in a given reaction. As a result, the economic advantage of our invention is of considerable importance, since it not only provides a greater yield of the desired product from a given weight of reactants, but also produces a product of superior detergent properties since less by-products are present in our product than in the product prepared in the manner of the prior art.

In the practice of our invention, 1 mole of an acyl chloride, i.e., a monocarboxylic acid of from 6 to 22 carbon atoms in the form of its acid chloride is gradually added to an aqueous solution containing 1 mole of an alkali metal salt of 2-aminoalkane sulfonic acid and from 0.25 to 2.0% by weight of a surface active and dispersing agent other than an N-acyl tauride, to produce 1 mole of the desired acyl tauride, sufficient alkali, i.e., sodium or potassium hydroxide or carbonate or phosphate, etc., being added either simultaneously or intermittently to maintain the pH level of the reaction mixture above 7 during condensation and at a temperature ranging between 15–90° C.

As examples of monocarboxylic acids which are employed in the form of acid chlorides with an alkali metal salt of a taurine or substituted taurine, any monocarboxylic acid chloride of at least 6 carbon atoms and not more than 22 carbon atoms may be employed. It is to be noted at the outset that the nature or character of the acid chloride is immaterial so long as it contains a minimum of 6 carbon atoms and not more than 22 carbon atoms. The acid chloride may be derived from a saturated or unsaturated aliphatic, alicyclic or aliphatic aromatic acid. Acids of this type include caproic acid, isocaproic acid, enanthic acid, δ-methylhexylic acid, caprylic acid, ε-methylheptylic acid, dipropylacetic acid, pelargonic acid, ζ-methyloctylic acid, capric acid, η-methylnonylic acid, isoamylisopropylacetic acid, undecylic acid, θ-methyldecylic acid, di-tert.-butylmethylacetic acid, lauric acid, diisoamylacetic acid, tridecylic acid, myristic acid, pentadecylic acid, palmitic acid, di-n-heptylacetic acid, margaric acid, stearic acid, di-n-octylacetic acid, nondecylic acid, arachidic acid, behinic acid, γ-hexenoic acid, β-hexenoic acid, pyroterebic acid (4-methyl-β-pentenoic acid), α-ethylcrotonic acid, α-ethylcrotonic acid, teracrylic acid, d-citronellic acid, ι-undecylenic acid, oleic acid, elaidic acid, erucic acid, brassidic acid, sorbic acid, stearolic acid, linolic acid, behenolic acid.

In addition to these acids, acids obtained from tall oil, hydrogenated tall oil, hydrogenated tallow, naphthenic, abietic and the like may be employed in the form of their acid chlorides. Alkyl benzoic acids, such as dodecyl benzoic acid, nonyl benzoic acid, octyl benzoic acid, alkyl naphthoic acids such as nonyl naphthoic acids and the like may be used in the form of their acid chlorides. Acid mixtures obtained by saponification of various natural plant and animal oils, such as olive, tallow, castor, peanut, coconut, soybean, cottonseed, linseed, palm, corn, and the like may also be employed in the form of their acid chlorides.

The 2-amino-alkane sulfonic acid salts that are condensed with the foregoing monocarboxylic acid chlorides are characterized by the following general formula:

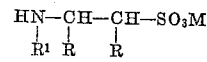

wherein R represents either hydrogen, methyl or ethyl groups, and $R^1$ represents either hydrogen or a hydrocarbon radical having from 1 to 20 carbon atoms, e.g. methyl, ethyl, propyl, butyl, amyl, hexyl, cyclohexyl, phenyl, heptyl, octyl, dodecyl, oleyl, linoleyl, stearyl, abietinyl, etc., and M represents an alkali or alkaline earth metal, e.g. sodium, potassium, lithium, etc.

As examples of 2-amino-alkane sulfonic acids that are reacted in the form of their alkali or alkaline earth metal salts with the above monocarboxylic acid chlorides to form anionic surface active agents, the following are illustrative:

*2-amino-alkane sulfonic acids*

| | |
|---|---|
| Taurine | N-isobutyl taurine |
| Ditaurine | N-tert.-butyl taurine |
| N-methyl taurine | N-amyl taurine |
| N-methyl ditaurine | N-hexyl taurine |
| N-ethyl taurine | N-cyclohexyl taurine |
| N-propyl taurine | N-phenyl taurine |
| N-isopropyl taurine | N-heptyl taurine |
| N-butyl taurine | N-octyl taurine |

In the case of the surface active and dispersing agents other than N-acyl taurides which are employed in a concentration ranging from 0.25 to 2.0%, any surface active and dispersing agent derived from the sulfonation of oils, fats, lignins, and aromatic and naphthenic hydrocarbons, from polyglycol ethers of alkyl phenols, phosphate esters and similar compounds may be employed. As is well known in the surface active and dispersing agent art, that to this class belong many others such as, for example, the alkali soaps, the soaps of water-soluble amines, the sulfonated oils (such as Turkey red oil), the sulfonated fatty alcohols and the fatty alcohol sulfates (such as the "Gardinols"), the sulfonaphthenates and petroleum sulfonates, the aromatic sulfonates (such as the sulfonated alkylnaphthalenes), the sulfosuccinic acid esters (such as the "Aerosols"), the aryl alkyl sulfonates (such as the Twitchell reagents), the sulfonated amides, sulfonated phenols, as well as many other sulfated, phosphated, and borated compounds.

As specific examples of the foregoing dispersing agents, the following are illustrative:

Tamol NNO (sodium salt of a sulfonated naphthalene condensate)
Prestabit Oil (sulfonated Red Oil)
Sodium Toluene Sulfonate
Nekal (sodium alkyl naphthalene sulfonate)
Marasperse (lignosulfonate)
Igepal (polyglycol ether of an alkyl phenol)
PVP (polyvinylpyrrolidone)
Alipal CO-436 (sulfated polyglycol ethers of an alkyl phenol)

In connection with the foregoing surface active and dispersing agents, it is to be noted that the nature or character of the same is immaterial so long as it exhibits wetting and dispersing properties. It is to be further noted that while Igepons are surface active and dispersing agents, they are excluded from the foregoing listing because their presence in the reaction mixture in small (i.e. 0.25–2.0%) quantities does not appreciably increase the acyl tauride formation as is evidenced in cases where a surface active and dispersing agent other than an Igepon is employed.

The following examples will illustrate the nature of the improved process and the results obtained therefrom.

*Example I*

A. A solution of 86 grams of N-methyltaurine (0.62 mole) as a 33.8% aqueous solution of the sodium salt was diluted with 361 grams of water and cooled to 25° C. There was added 9 grams of Tamol NNO as a dispersing agent, then there was added dropwise with agitation over two hours at 25–30° C., 92.5 grams of 93% tallow acid chloride (0.0296 m.), during which addition the pH of the reaction mixture decreased from 10.94 to 6.95. The methyl taurine hydrochloride formed was liberated by adjusting the pH to 10.5 through addition of 30% aqueous potassium hydroxide, and an additional 46 grams of 93% tallow acid chloride (0.147 mole) added dropwise, with a decrease in pH from 10.5 to 7.14. Aqueous 30% potassium hydroxide was added to liberate methyl taurine from its salt, and acid chloride addition again made over a pH range of 10.1 to 7.00. Alternate additions of potassium hydroxide and tallow acid chloride were continued in a similar manner until a total of 185 grams of 93% tallow acid chloride (0.593 mole) was added to complete the reaction. The product on analysis contained 254 grams of N-tallow acid-N-methyltauride as the sodium salt, 100% of the theoretical yield based on the acid chloride charged, and 4.07% free tallow acid on the 100% product basis.

B. As a control, 185 grams of 93% tallow acid chloride (0.593 mole) was reacted with 86 grams of N-methyl taurine (0.62 mole) as a 33.8% solution of its sodium salt diluted with 361 grams of water in a manner identical with Example IA with the exception that no dispersing agent was added to the mixture. There was obtained 240 grams of N-tallow acid-N-methyl tauride as the sodium salt, 94.3% of theory based on the fatty acid chloride used, and 4.94% of free tallow acid on the 100% product basis.

*Example II*

A. Operating as in Example IA, 319 grams of 97% palmitic acid chloride (1.125 moles) was added over 2 hours at 39–41° C. to an agitated mixture comprising 595 grams (2.85 moles) of N-cyclohexyltaurine as a 26.9% aqueous solution of the sodium salt diluted with 400 grams of water and 36 grams of Tamol NNO. During the addition, the pH was reduced from 10.5 to 6.9. Sufficient sodium hydroxide was then added as a 30% aqueous solution to neutralize the cyclohexyltaurate-hydrochloride formed during the acyl chloride addition, and alternate acyl chloride and caustic additions continued within the range of 10.5 to 6.9 until a total of 638 grams of 97% palmitic acid chloride (2.25 moles) was added at 39–41° C., to the reaction mixture. Upon analysis, the product, 3742 grams, was found to contain 1050 grams of sodium N-palmitoyl-N-cyclohexyltaurate, 99.6% of the theoretical yield, and 20.7 grams of palmitic acid.

B. Operating in an identical manner as in Example IIA with the exception that dispersing agent was added to the reaction mixture, there was obtained 3.694 grams of product containing 931 grams of sodium-N-palmitoyl-N-cyclohexyltaurate, 88.6% of the theoretical yield, and 65.5 grams of palmitic acid.

*Example III*

A. Operating in the conventional manner for the preparation of Igepons as described by Kastens and Ayo, loc. cit. as a control, a solution of 132 grams of N-cyclohexyltaurine as a 26.9% solution of the sodium salt was diluted with 100 grams of water. The reaction mixture was maintained at 40° C. and there was added simultaneously over a four hour period 142 grams of 95% palmitic acid chloride (0.49 mole) and 87 grams of 30% aqueous sodium hydroxide (0.64). A slight stoichiometric excess of sodium hydroxide was maintained in the mixture at all times as determined by spot tests on triazene paper (pH 12.2–13.0). Upon completion of the reaction, there was obtained by analysis 0.378 mole, 77.3% of the theoretical yield, of sodium N-palmitoyl-N-cyclohexyltaurate.

B. Operating as in Example IIIA, 8.2 grams of Tamol NNO was added to the cyclohexyl taurate solution before the simultaneous addition of palmitic acid chloride and aqueous sodium hydroxide. There was obtained 0.397 mole, 81% of the theoretical yield, of sodium-N-palmitoyl-N-cyclohexyl taurate.

C. Operating as in Example IIIA, 8.2 grams of Igepal

CO-630 was added to the cyclohexyl taurate solution before the simultaneous addition of palmitic acid chloride and aqueous sodium hydroxide. There was obtained 0.382 mole, 78% of the theoretical yield, of sodium-N-palmitoyl-N-cyclohexyl taurate.

D. Operating as in Example IIIA, 8.2 grams of polyvinylpyrrolidone was added to the cyclohexyltaurate solution before the simultaneous addition of palmitic acid chloride and aqueous sodium hydroxide. There was obtained by analysis 0.392 mole, 80% of the theoretical yield, of sodium-N-palmitoyl-N-cyclohexyl taurate.

E. Operating as in Example IIIA, 4.1 grams of a sulfated and sulfonated oleic acid was added to the cyclohexyltaurate solution prior to the simultaneous addition of palmitic acid chloride and aqueous sodium hydroxide. There was obtained by analysis 0.416 mole, 85.1% of the theoretical yield, of sodium-N-palmitoyl-N-cyclohexyltaurate.

F. Operating as in Example IIIA, 8.2 grams of a phosphoric acid ester of an alkyl aryl polyglycolether (Agent AT-355) was added to the cyclohexyltaurate solution prior to the simultaneous addition of palmitic acid chloride and aqueous sodium hydroxide. There was obtained by analysis 0.406 mole, 83.0% of the theoretical yield, of sodium N-palmitoyl-N-cyclohexyltaurate.

G. Operating as in Example IIIA, 8.2 grams of a dioctylester of sodiumsulfosuccinic acid was added to the cyclohexyltaurate solution prior to the simultaneous addition of palmitic acid chloride and aqueous sodium hydroxide. There was obtained by analysis 0.40 mole, 81.6% of the theoretical yield, of sodium N-palmitoyl-N-cyclohexyltaurate.

H. Operating as in Example IIIA, 8.2 grams of a sulfated alkyl phenolpolyglycol ether (Alipal CO-436) was added to the cyclohexyltaurate solution prior to the simultaneous addition of palmitic acid chloride and aqueous sodium hydroxide. There was obtained by analysis 0.41 mole, 83.7% of the theoretical yield, of sodium N-palmitoyl-N-cyclohexyltaurate.

Example IV

A. Operating as in Example IA to eliminate the presence of inorganic alkali during the acylchloride addition, 150 grams of 95% coconut fatty acid chloride (0.596 mole) was reacted within the temperature range of 20–30° C. and the pH range of 10.4–6.9 with a solution of 85.8 grams (0.616 mole) of methyltaurine as the sodium salt and 8 grams of Tamol NNO dissolved in 434 grams of water. When the reaction mixture reached the pH 6.9–7.2 range during the acid chloride addition, increments of 30% aqueous sodium hydroxide were added to liberate the methyltaurine base from its hydrochloride, as evidenced by a pH increase to 10.0–10.4. Upon analysis of the slurry, there was found by analysis 100% of the theoretical amount of sodium N-coconut fatty acid-N-methyl taurate and, 0.52% by weight coconut fatty acid, and 0.21% by weight methyl taurine.

B. In a control operation identical with Example IVA with the exception that no dispersing agent was added to the initial sodium methyl taurate solution, the slurry was found by analysis to contain 96.2% of the theoretical quantity of sodium N-coconut fatty acid N-methyltaurate, 0.75% by weight coconut fatty acid, and 0.28% by weight methyl taurine.

Example V

A. Operating as in Example IA, 150 grams of 95% coconut fatty acid chloride (0.596 mole) was reacted at 50° C. and over the pH range of 6.9–10.6 with 77 grams (0.616 mole) of taurine as the sodium salt and 6 grams of Tamol NNO as dispersing agent. The resultant slurry of sodium-N-coconut fatty acid taurate was obtained by analysis in 97.2% of the theoretical yield.

B. As a control, Example VA was repeated without the addition of 6 grams of Tamol NNO as dispersing agent. The resultant slurry of sodium N-coconut fatty acid taurate was obtained in 92.8% of the theoretical yield by analysis.

Example VI

A. Operating as in Example IA, 150 grams of 95% coconut fatty acid chloride (0.596 mole) was reacted at 15–18° C. and within a pH range of 6.8–10.7 with 112 grams (0.616 mole) of N-butyltaurine as the potassium salt dissolved in 425 grams of water with 5 grams of Tamol NNO added as a dispersing agent.

The resultant slurry of potassium N-coconut fatty acid-N-butyl taurate was obtained by analysis in 99.8% of the theoretical yield.

B. As a control, Example VI (A) was repeated without the addition of 5 grams of Tamol NNO as a dispersing agent. The resultant slurry of potassium N-coconut fatty acid-N-butyl taurate was obtained by analysis in 97.9% of the theoretical yield.

Example VII

Example I was repeated with the exception that 86 grams of N-methyltaurine sodium salt was replaced by 117 grams of N-propyltaurine sodium salt. The resultant slurry of sodium N-tallow acid-N-propyl taurate was obtained by analysis in 97% of the theoretical yield.

We claim:

1. The process of preparing N-acyl taurides which comprises condensing 1 mole of a metal salt of 2-aminoalkane sulfonic acid having the following general formula:

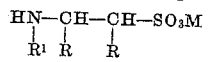

wherein R represents a member selected from the class consisting of hydrogen, methyl and ethyl groups, and $R^1$ represents a member selected from the class consisting of hydrogen and a saturated hydrocarbon radical containing from 1 to 20 carbon atoms, and M represents a metal selected from the class consisting of alkali and alkaline earth metals, with substantially 1 mole of a mono-carboxylic acid chloride of 6 to 22 carbon atoms in the presence of 0.25 to 2.0% by weight of a surface active and dispersing agent other than N-acyl tauride at a temperature ranging between 15 and 90° C.

2. The process according to claim 1 wherein the metal salt of the 2-aminoalkane sulfonic acid is sodium N-methyl taurate.

3. The process according to claim 1 wherein the metal salt of the 2-aminoalkane sulfonic acid is sodium N-cyclohexyl taurate.

4. The process according to claim 1 wherein the metal salt of the 2-aminoalkane sulfonic acid is sodium taurate.

5. The process according to claim 1 wherein the metal salt of the 2-aminoalkane sulfonic acid is the sodium N-butyl taurate.

6. The process according to claim 1 wherein the metal salt of the 2-aminoalkane sulfonic acid is the sodium N-propyl taurate.

No references cited.